Nov. 20, 1951 H. L. GLICK 2,575,708

PULSE GENERATOR

Filed Sept. 30, 1948

WITNESSES:

INVENTOR
Harvey L. Glick.
BY
ATTORNEY

Patented Nov. 20, 1951 2,575,708

UNITED STATES PATENT OFFICE 2,575,708

PULSE GENERATOR

Harvey L. Glick, Pittsburgh, Pa., assignor to Westinghouse Electric Corporation, East Pittsburgh, Pa., a corporation of Pennsylvania Application September 30, 1948, Serial No. 52,045

12 Claims. (Cl. 250—27)

Figure 2:
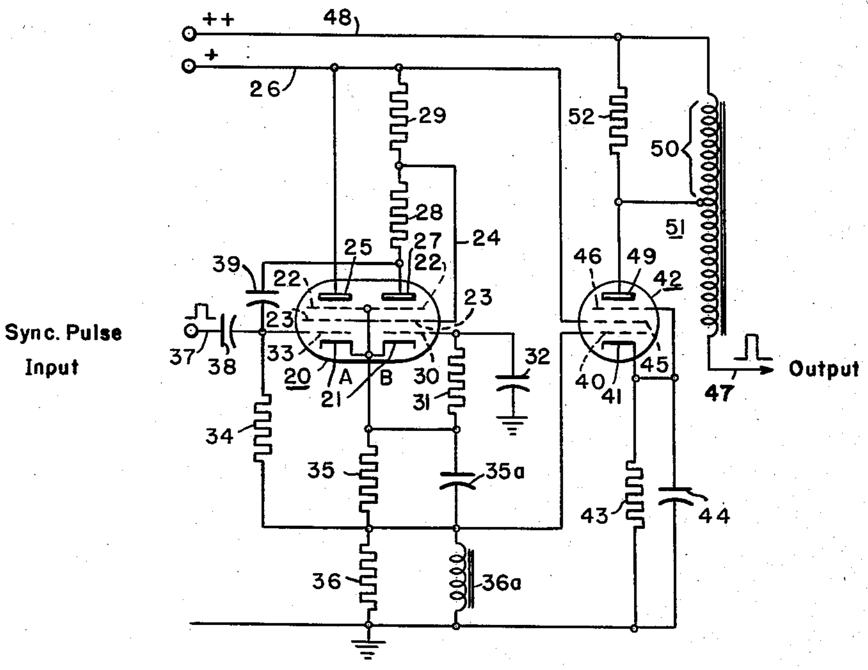

This invention relates generally to circuits for producing electrical impulses, and more particularly to pulse generators of the blocking impulse type, adapted for providing high voltage surges of short duration.

Pulse generators of the blocking impulse type involve circuits which are normally quiescent, that is, circuits wherein the voltages at various points in the circuit remain of constant value until a control or triggering impulse is applied to the generator, whereupon the values of the circuit voltages vary through an operating cycle and thereafter resume their initial values. Circuits of this character may comprise one or more electronic devices biased to prevent variation of the voltages applied to the devices. The blocking bias is momentarily overcome by a triggering impulse, enabling the circuit to go through one cycle of operation, whereupon the circuit is again blocked, requiring a further triggering impulse to initiate a further cycle of operation. The duration, wave shape, and amplitude of the ouput pulse or surge provided by the generator circuit are determined by the electrical constants of the circuit, while the triggering pulse determines only the time at which output pulses will be generated. Pulse generating circuits of the type described find wide application in the electrical arts, and if the outputs thereof are of sufficiently high voltage values, they may be utilized for establishing arcs in spark gaps, ignitrons, and the like.

The triggering circuit comprising the present invention may be utilized particularly for triggering pulse modulators of the type utilized in pulse radar equipments for generating high frequency pulses of extremely short duration and high power. Triggering circuits of this type may be required to produce transient voltage surges rising to amplitudes of several kilovolt peaks in a few micro-seconds or less. While several types of trigger circuits have been developed for producing the desired voltage surges, those circuits with which I am familiar are relatively complex and when incorporated into physical equipment lead to bulky, heavy, and, uneconomical and undesirable, devices.

It is an object of the present invention to provide a high voltage triggering pulse generator for establishing high voltage pulses of short duration, which has advantages of simplicity of circuitry, and which, when incorporated in physical equipment, occupies relatively small bulk, and lends itself to particularly economical fabrication.

It is a further object of the invention to provide improved apparatus for producing high voltage pulses having extremely short durations, and extremely rapid rise and decay times.

It is still a further object of the invention to provide an improved system for producing high voltage pulses of short duration, having extremely short durations, the durations, amplitudes and wave shapes of the high voltage pulses being independent of the wave shapes, amplitudes and durations of control signals utilized to initiate the high voltage pulses, the system being operative over a wide range of pulse frequencies.

Briefly described, the blocking impulse generator in accordance with the present invention comprises a pair of hard electronic discharge devices or tubes having their cathodes interconnected over a path of zero (or short circuit) impedance. The first of the tubes is operated at or beyond plate cut-off, in the quiescent state of the generator, while the second is operated with a predetermined plate current, flowing in a cathode to ground circuit common to the two tubes. Advent of a synchronizing pulse or signal at the control grid of the first tube establishes plate current therein which raises the potential of the cathodes with respect to ground. The control grid of the second tube is temporarily established at a predetermined value with respect to ground, equal to the cathode potential in the quiescent state of the oscillators. Raising of the cathode potential of the tubes, then, renders the control grid of the second tube more negative than its cathode, reducing plate current flow therein. This reduction is reflected in the plate circuit of the tube as an increase of plate potential, which is transferred to the grid of the first tube, to accomplish a rapid cumulative increase in its grid voltage and consequently of the current flow in the common cathode circuit. After a saturation condition has been reached, further increase of cathode current ceases, and the control grid of the second tube is permitted to approach and ultimately reach cathode potential. This action initiates an increase in plate current in the second tube, which is communicated to the control grid of the first tube as a decrease of potential. The action is rapidly cumulative, and results in a rapid decrease of current in the common cathode circuit.

Pulse output may then be derived from the common cathode circuit of the two tubes above mentioned. The blocking impulse generator of the present invention has particular utility, and is particularly advantageous, because the pulse output is derived entirely from a cathode circuit, i. e., by cathode coupling, which enables high power output to be derived without affecting the amplitude or the rate of rise or decay, or the duration, of the pulses generated.

It is, accordingly, a broad object of the invention to provide a blocking impulse generator having high power output capability.

It is a further broad object of the invention to provide a novel and improved blocking impulse generator comprising electronic discharge devices wherein output pulses are derivable entirely from a cathode load connected in the cathode circuits of the electronic discharge devices, enabling attainment of high power pulse output without affecting the pulse shapes of the generated impulses.

Figure 1:
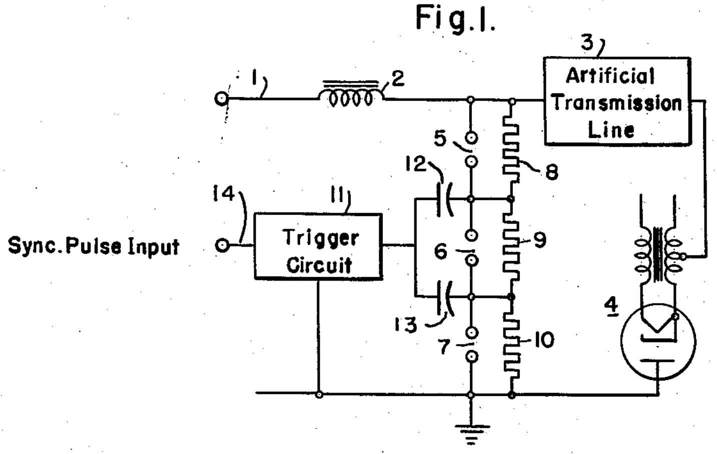

The novel features which I consider to be characteristic of my invention are set forth particularly in the appended claims. The invention itself, both as to its organization and its method of operation, together with a preferred mode of applying the same, and additional objects and advantages thereof, will best be understood from the following description of a specific embodiment thereof, especially when read in conjunction with the accompanying drawing, wherein:

Figure 1 is a schematic circuit diagram of a pulse modulator of the type frequently utilized in pulse radar transmitters, to which my novel pulse generator may be applied, and Figure 2 is a schematic circuit diagram of a pulse generator arranged in accordance with the invention.

Referring now more particularly to Figure 1 of the drawing, the reference numeral 1 designates a voltage supply line which is maintained at a high positive potential with respect to ground, there being connected in series with the line 1 a high inductance choke 2, an artificial transmission line 3 and a load 4, the load 4 normally comprising a magnetron oscillator, which is coupled between the line 3 and ground through a transformer (not shown). Connected between the high potential end of the artificial transmission line 3 and ground is a series of spark gaps 5, 6 and 7, connected in series relation, one with another, suitable resistances 8, 9 and 10 being connected in parallel with each of the spark gaps 5, 6 and 7, respectively, to establish across the latter direct current potentials determined by the relative magnitudes of the resistances 8, 9 and 10, and by the potential existing between the line 1 and ground. Normally, the resistances 8, 9 and 10 may be expected to be of substantially equal values, so that the voltage available between the line 1 and ground is divided equally across each of the spark gaps 5, 6 and 7.

The spark gaps 5, 6 and 7 are designed to withstand the voltages applied thereto under static conditions without breaking down. Accordingly, a direct current voltage is established across the artificial transmission line 3, in the interval between pulses, having a magnitude substantially equal to the voltage existing between line 1 and ground, which establishes electrical energy within the artificial transmission line 3, the latter acting substantially as a storage condenser. A source of triggering voltage comprising a trigger circuit 11 is connected with the junction point between the spark gaps 5 and 6, and between the spark gaps 6 and 7, by separate coupling condensers 12 and 13, respectively. The triggering circuit 11, when energized or controlled to provide a surge of voltage, applies this voltage between the junction point of the spark gaps 5, 6 and 6, 7, and ground, which serves to break down or ionize the gas contained in the spark gaps, thereby to enable the artificial transmission line 3 to discharge its energy through the spark gaps 5, 6 and 7, and through the load 4 comprising a magnetron oscillator as previously described, and effecting thereby generation of an ultra high frequency pulse of extremely short duration, the duration of the pulse being determined by the discharge time of the transmission line 3.

In circuits of this type, the trigger circuit 11 is of the type generally described in the art as a blocking impulse generator, which establishes one high amplitude pulse of extremely short duration in response to each synchronizing pulse applied thereto, being quiescent in the intervals between synchronizing pulses. In the present exemplification of my invention, synchronizing pulses are applied to the trigger circuit 11 over a line 14, being derived from a source of such pulses of a character well known in the art relating to pulse radar transmitters. Interposition of the triggering circuit 11 between the spark gaps 5, 6 and 7 and the source of synchronizing pulses is necessitated, as is normally the case, when the synchronizing pulses themselves are of unsuitable character for triggering the spark gaps because of insufficient amplitude or unsuitable wave form.

Circuits of the general character of that illustrated in Figure 1 of the drawing and described hereinabove are well known in the art, the novelty of the present system inhering in the specific character of the triggering circuit 11, one exemplification of which is illustrated in the schematic circuit diagram of Figure 2 of the accompanying drawing. It will be understood that the blocking impulse generator illustrated in Figure 2 of the accompanying drawing may have many applications of diverse nature additionally to the application thereof which is illustrated in Figure 1 of the drawing, including triggering of other types of radar pulse modulators, of the diverse characters now well understood in the pertinent art, and applications to the firing of gaseous control devices such as ignitrons, which require for their efficient firing extremely high voltage pulses of relatively short durations.

Referring now more particularly to Figure 2 of the drawing, there is illustrated in schematic circuit diagram a blocking impulse generator arranged in accordance with the present invention, and comprising a twin pentode electronic tube 20 having two sections A and B, which may be identical. The cathodes 21 of the twin pentode 20 may be tied together electrically, and may be further interconnected with the suppressor grids 22 of the twin pentode 20, either internally or externally of the tube, to maintain the suppressor grids at cathode potential. The screen grids 23 of the twin pentode 20 may be tied together internally or externally of the tube, and a single lead 24 may be connected to establish a common potential for the screen grids 23. The anode 25 of the section A of the twin pentode 20 may be connected directly with a source 26 of positive potential. In accordance with an embodiment of my invention which I have constructed and tested, the magnitude of the potential source 26 was of the order of 500 to 800 volts, for satisfactory operation. I do not intend, however, to be limited to this range of values, but cite them for purposes of illustration only. The anode 27 of the B section of the twin pentode 20 may be connected with the line 26 via the pair of series connected resistors 28 and 29, to the intermediate point of which is connected the lead 24. This connection establishes a potential for the screen grids 23 of the twin pentode 20. When the B section of the pentode 20 is conductive, during the quiescent intervals, the screen voltages are low because of the drop across resistor 29. When section B becomes non-conductive and section A becomes conductive, during the pulse intervals, grid 23 is at the higher potential of the line 26. The tendency of section A to become conductive (its sensitivity) is thus increased during the pulse period.

The control grid 30 of the B section of the twin pentode 20 is connected to the cathodes 21 of the tube via a resistor 31, and is further connected to ground over a charging condenser 32. The control grid 33 of the A section of the twin pentode 20 is connected via a coupling resistance 34 to the intermediate point of a pair of resistors 35 and 36, the latter being connected in series between the cathode 21 of the twin pentode 20 and ground, and a lead 37 is provided for imposing upon the control grid 33 via a coupling condenser 38 synchronizing pulses from a source (not shown). The lead 37 of Figure 2 may correspond then, with the lead 14 of the system illustrated in Figure 1 of the drawing.

In the quiescent state of the circuit, that is in the intervals between synchronizing pulses, the potential of the control grid 33 is established at a value more negative than the potential of the cathodes 21, and accordingly the A section of the twin pentodes 20 is normally maintained in cut-off condition, no plate current flowing in this section. On the other hand, the control grid 30 of the B section of the twin pentode 20 is connected via the coupling resistor 31 directly with the cathodes 21, and, being thus at a higher potential than is the control grid 33, establishes a predetermined plate current flow in the B section of the twin pentode 20. It is this current which, flowing through the resistor 35 serves to establish a cut-off bias for the control grid 33 in the A section of the twin pentode 20.

Upon application to the control grid 33 of a synchronizing pulse, the potential of the control grid 33 is driven above its cut-off value, and plate current commences to flow in the A section of the twin pentode 20, increasing current flow in the cathode resistors 35, 36, and raising the potential of the cathodes 21 with respect to ground. The control grid 30 of the B section of the twin pentode 20, being connected with the cathodes 21 tends to assume the potential of the latter, but is prevented from so doing by the charging circuit comprising the series connected resistor 31 and charging condenser 32, which requires a considerable time to establish a considerable charge in condenser 32 in response to the potential existing across the resistors 35 and 36, or otherwise stated the potential existing between the cathode 21 and ground. Accordingly, the control grid 30 maintains its potential while the potential of the cathodes 21 rises in a positive sense and the potential difference between the control grid 30 and the cathodes 21 accordingly increases, decreasing the total current flow through the B section of the twin pentode 20. As the current through the B section of the twin pentode decreases, the potential of the anode 27 thereof increases, due to the fact that the potential drop in the resistors 29 and 28 connected in series with the anode 27 decreased. This increase of potential is transferred to the control grid 33 of the A section of the twin pentode 20 via a coupling condenser 39, establishing still a higher current in the A section of the twin pentode. The further increase in the potential of the control grid 33, and the consequent increase of current flowing in the A section of the twin pentode, raises the cathode 21 still further in potential with respect to ground, establishing in effect a still higher negative potential on the grid 30 with respect to the cathode 21, and reducing still further the current flow in B section, and consequently increasing still further the potential of the anode 27 of the B section. The action may be seen to be rapidly cumulative, and will be terminated only when either the B section of the twin pentode 20 is driven to cut off, or the A section of the twin pentode 20 is driven to saturation, so that no further changes the potential of the anode 27 may take place.

The maximum possible change in current in the cathode circuit of the twin pentode 20 takes place in an extremely short period of time. After this maximum value has been attained, however, the potential of control grid 30 commences to rise as the condenser 32 charges through the charging resistor 31, and approaches the potential of the cathode 21, establishing current flow in the B section of the twin pentode. As current flow is established in the B section of the twin pentode, the potential of the anode 27 decreases, this decrease being communicated to the control grid 33 via the coupling condenser 39, decreasing the potential of the control grid 33, and correspondingly the potential of the cathode 21. Each decrease of potential of the cathode 21, however, serves to hasten the approach of voltage correspondence between the cathode 21 and the grid 30, which serves further to lower the voltage of the anode 27, so that the voltage decay established across the resistors 35 and 36 in the cathode circuit of the twin pentode 20 proceeds at an extremely rapid rate until interpulse equilibrium is again established. Equilibrium is maintained until the advent of a further synchronizing pulse on the lead 37, when the cycle of events above described repeats itself.

In order to establish a relatively constant bias for the control electrode 33, the resistance 35 is shunted by a smoothing condenser 35*a*, the total potential developed across the resistance 35 being relatively constant, and dependent on the average plate current of both sections of the twin pentode 20, over a considerable period of time. Pulse output is developed primarily across the cathode resistor 36 and its associated choke shunt 36*a*, the latter having a high impedance to the generated pulses, to accentuate the latter. The choke 36*a* possesses a low impedance to ground for direct current, whence the total direct current bias is that established by the resistance 35 and the condenser 35*a*, whereas the choke 36*a* presents the primary output impedance to pulses generated in the cathode circuit of the twin pentode 20.

The output of the signal pulse generator comprising the twin pentode tube 20 is taken from the resistance 36 connected in the cathode circuit of the tube, being applied between the control grid 40 and the cathode 41 of a pentode voltage amplifier 42. The latter contains in its cathode circuit a parallel combination of resistance 43 and condenser 44, which establishes an average bias for the pentode 42 adequate to cut off the plate current thereof in the intervals between pulses. This bias would also be provided by a gas tube of the voltage regulator type connected between the cathode 41 and ground. Steady potential for the screen grid 45 of the voltage amplifying pentode 42 is botained by connecting the latter directly to the positive line 26. The suppressor grid 46 of the pentode 42 is connected directly to the cathode 41 in accordance with the conventional practice. The plate 49 of the pentode 42 is connected with a further source of positive potential 48, having considerably greater voltage with respect to ground than does the line 26 with respect to ground, and which constitutes the main power supply of the present system. The voltage supply line 48 is connected with the plate or anode 49 via a portion 50 of a transformer 51, which is of the step-up autotransformer type, preferably having low capacity and high leakage and open circuit inductances. The total voltage established across the transformer 51 is then applied via the lead 47 to the coupling condensers 12 and 13 (Figure 1), and hence to the junction of the spark gaps 5, 6 and 7 of Figure 1, to cause the latter to break down, and thus to enable the artificial transmission line 3 to transfer its energy to the load circuit 4. Because of the high leakage, and the essentially capacitative load presented by the spark gaps 5, 6 and 7 as seen from the transformer 51, the amplified and stepped-up pulses may have pronounced superimposed oscillations. While these oscillations may, in some cases, be advantageous, they may be damped by connecting a resistor 52 across the transformer portion 50.

It will be readily apparent to those skilled in the art that the use specifically of a twin pentode such as identified by the reference numeral 20, is relatively arbitrary in the pulse generator comprising the present invention, and that two separate pentodes might be utilized, or, in fact, that tetrodes or triodes may be utilized instead of pentodes, the suppressor and screen grids of the twin pentode 20 performing no function beyond that normally ascribed to such grids in pentode tubes.

It will be further obvious that the use of a pentode amplifier, such as is illustrated specifically in Figure 2 of the drawing and there identified by the reference numeral 42, is relatively arbitrary and that a tetrode or triode may be utilized instead, without departing from the true spirit of the present invention.

It will further be apparent to those skilled in the art that still further modifications may be made in the specific circuit arrangement illustrated without departing from the true principles of my invention.

I claim as my invention:

1. A blocking impulse generator comprising a first electronic discharge device comprising a first cathode, a first anode, a first control electrode, and a second electronic discharge device comprising a second cathode, a second anode, and a second control electrode, a source of potential positive with respect to ground connected with said first anode and with said second anode in parallel, an impedance connected intermediate said source of potential and said second anode, a common output impedance for said first and second electronic discharge devices connected between said cathodes and ground, means for connecting said first control electrode with said output impedance to establish an anode current cut-off bias for said first electronic discharge device, means for coupling said second anode with said first control electrode, means connecting said second control electrode with said cathodes comprising a resistor, means for coupling said second control electrode with ground comprising a charging condenser for delaying transfer of variations of cathode potential to said second control electrode, and means for deriving voltage impulses from said output impedance.

2. A blocking impulse generator comprising a first electronic discharge device comprising a first cathode, a first anode, and a first control electrode and a second electronic discharge device comprising a second cathode, a second anode and a second control electrode, a source of potential positive with respect to ground connected with said first anode and with said second anode, an impedance connected intermediate said source of potential and said second anode, a common output impedance for said first and second electronic discharge devices connected between said cathodes and ground, means for connecting said first control electrode with said output impedance at an intermediate point thereof to establish an anode current cut-off bias for said first electronic discharge device, circuit means for coupling said second anode with said first control electrode, said circuit means comprising a capacitive coupling for transferring variations of potential only of said second anode to said first control electrode, means connecting said second control electrode with said cathodes comprising a resistor for establishing said second control electrode normally at the potential of said cathode to provide a predetermined normal current flow in said second electronic discharge device, means coupled with said second control electrode for establishing a predetermined delay in transfer of potentials between said cathode and said second control electrode, a source of positive synchronizing pulses for application to said first control electrode for establishing current flow in said first electronic discharge device in response to each synchronizing pulse, and means for deriving voltage impulses from said output impedance.

3. A blocking impulse generator comprising a first electronic discharge device having a first cathode, anode, and control electrode, a second electronic discharge device having a second cathode, anode and control electrode, means for applying anode potential to said discharge devices, means for establishing a common cathode connected load circuit for said electronic discharge devices, means for coupling said second control electrode with said cathodes, said means for coupling comprising means for delaying transfer of potential variations between said cathodes and said second control electrode, means for causing said first control electrode to follow variations in the potential of said second anode, a source of a control pulse, means for applying said control pulse to said first control electrode, whereby the potential of said cathodes is raised to raise the anode potential of said second discharge device, and said first discharge device is rendered cumulatively more conductive until the potential of said cathode reaches a predetermined maximum value, whereupon, after attainment of said predetermined maximum value, said means for delaying transfer of potential changes between said cathodes and said second control electrode acts to vary said potential of said second control electrode toward coincidence with the potential of said cathodes to cause the potential of said cathodes to be cumulatively reduced to a predetermined minimum value.

4. A normally quiescent blocking impulse generator comprising a first electronic discharge device having a first cathode, anode, and control electrode, a second electronic discharge device having a second cathode, anode, and control electrode, means for establishing a common pulse output circuit in the cathode circuits of said electronic discharge devices, resistance means for coupling said second control electrode with said cathodes, whereby said second control electrode assumes the potential of said cathodes in the quiescent state of said generator, means for delaying transfer of variation of potential of said cathodes from said cathodes to said second control electrode, means normally biasing said first electronic discharge device beyond cut-off, means normally biasing said second electronic device to establish a predetermined anode current therein, thereby to establish a predetermined normal potential of said cathodes, a source of a control pulse, means responsive to said control pulse for effecting current flow in said first electronic discharge device sharply to raise the potential of said cathodes, means responsive to raising of the potential of said cathodes for applying positive signals to said first control electrode for cumulatively raising the magnitude of current flow in said first electronic device to cumulatively further raise said potential of said cathodes to a predetermined maximum value, and whereby after attainment of said predetermined maximum value, said means for delaying transfer of variations of potential of said cathodes to said second control electrode, becomes effective to initiate cumulative reduction of the potential of said cathodes to a predetermined minimum value.

5. A blocking impulse generator comprising a first electronic discharge device having a first cathode, anode, and control electrode, a second electronic discharge device having a second cathode, anode, and control electrode, means for supplying anode potential to said discharge device, means for establishing a pulse output circuit common to the cathode circuits of said first and second electronic discharge devices, means for coupling said second control electrode with said cathodes, said means for coupling comprising means for transiently delaying transfer of potential variations between said cathodes and said second control electrode and for biasing said second discharge device to be conductive when the generator is in the quiescent state, a source of a positive control pulse, means for applying said control pulse to said first electrode whereby the potential of said cathodes is raised to reduce current flow in said second electronic discharge device, means responsive to reduction of current flow in said second electronic discharge device for raising the potential of said first control electrode to further raise said potential of said cathodes, the increase of potential of said cathode being cumulative to a predetermined maximum value, said transient delaying means being responsive to attainment of said predetermined maximum value to initiate a decrease of the potential of said cathodes to render said second discharge device cumulatively more conductive.

6. A blocking impulse generator comprising a first electronic discharge device having a first cathode, anode, and control electrode, a second electronic discharge device having a second cathode, anode and control electrode, means for supplying anode potential to said discharge devices, means for establishing a common load circuit between said cathodes jointly and a point of reference potential, means for establishing a fixed predetermined potential for said second control electrode for establishing a predetermined current flow in said second discharge device during a quiescent period of operation of said blocking impulse generator and for delaying the transfer of potential variations between said cathodes and said second control electrode, means for establishing a cut-off bias on said first control electrode for said first electronic discharge device, a source of a positive pulse, means for applying said positive pulse to said first control electrode to raise the potential of said first control electrode with respect to said cathodes, whereby to raise the potential of said cathodes with respect to said reference point and with respect to the potential of said second control electrode and to decrease current flow in said second electronic discharge device, and thereby increase the anode potential of said second discharge device, means for causing the potential of said first control electrode to follow variations in the anode potential of said second discharge device, whereby current flow in said first electronic discharge device and in said cathode load circuit will increase cumulatively to a predetermined maximum value.

7. A normally quiescent blocking impulse generator comprising a first electronic discharge device, said first electronic discharge device comprising a first cathode, anode and control electrode, a second electronic discharge device comprising a second cathode, anode and control electrode, a source of potential positive with respect to ground connected with said first anode and with said second anode in parallel, an impedance connected intermediate said source of potential and said second anode, a common output impedance for said first and second electronic discharge devices connected between said cathode and ground, said common output impedance comprising a bias developing circuit having a relatively low impedance to pulses and a pulse developing circuit having a relatively low impedance to direct current and relatively high impedance to pulses, means for connecting said first control electrode with said means for developing bias to establish an anode current cut-off bias for said first electronic discharge device, means for coupling said second anode with said first control electrode, said last named means comprising a capacitive circuit for transferring variations of potential from said second anode to said first control electrode, means connecting said second control electrode with said cathode comprising a resistor, to establish said second control electrode at the potential of said cathode during a quiescent state of said generator, means for coupling said second control electrode with ground comprising a charging condenser for delaying transfer of variations of cathode potential to said second control electrode, and means for deriving voltage impulses from said output impedance.

8. A pulse generator comprising first and second electronic discharge devices, a common cathode load circuit for said first and second electronic discharge devices, means responsive to application of a transient voltage impulse to said first electronic discharge device for cumulatively increasing current flow in said first electronic discharge device and decreasing current flow in said second electronic discharge device while rapidly increasing current flow in said common load circuit, and means responsive to establishment of a predetermined current flow in said common load circuit and operative at a predetermined instant after such establishment for initiating decrease of current flow in said first electronic discharge device and increase of current flow in said second electronic discharge device and rapid decrease of current in said common load circuit.

9. A pulse generator comprising a first electronic discharge device, a second electronic discharge device, a common cathode load circuit connected with said first and second electronic discharge devices, means responsive to initiation of current flow in said first electron discharge device for cumulatively establishing saturation current flow in said first electronic discharge device, said last named means comprising said second electronic discharge device, and means responsive to establishment of said saturation current and operative at a predetermined instant thereafter for decreasing said current flow in said first electronic discharge device to zero magnitude, said last named means comprising said second mentioned electronic device.

10. A blocking impulse generator comprising a first electronic discharge device having a cathode and an anode, a source of positive potential connected directly with said anode, an output load circuit connected in series with said cathode, means normally preventing current flow in said first electronic discharge device, a second electronic discharge device and an anode resistor connected in parallel with said first electronic discharge device, means for establishing a transient current flow in said first electronic discharge device, means responsive to said establishment of a transient current flow for actuating said second electronic discharge device to generate a cumulative control signal adopted and arranged cumulatively to increase said transient current flow, and means comprising said second electronic discharge device for thereafter cumulatively reducing said transient current flow in said first electronic discharge device to zero magnitude.

11. A blocking impulse generator comprising a first electronic discharge device having a first cathode, a first anode, a first control electrode and a second electronic discharge device comprising a second cathode, a second anode, and a second control electrode, means for applying anode potential to said discharge devices, a common output impedance for said first and second electronic discharge devices connected between said cathodes and ground, means for connecting said first control electrode with said output impedance to establish an anode current cut-off bias for said first electronic discharge device, means for coupling said second anode with said first control electrode, means connecting said second control electrode with said cathodes comprising a resistor, and means for coupling said second control electrode with ground comprising a charging condenser for delaying transfer of variations of cathode potential to said second control electrode.

12. A blocking impulse generator comprising first and second electronic discharge devices each having an anode, a cathode and a control electrode, means for supplying anode potential to said discharge devices, a common output load circuit connected in series with the cathodes of said discharge devices, means normally preventing current flow in said first discharge device, means for establishing a transient current flow in said first electronic discharge device, means responsive to said establishment of a transient current flow for actuating said second electronic discharge device to generate a cumulative control signal adapted and arranged cumulatively to increase said transient current flow, and means comprising said second electronic discharge device and thereafter cumulatively reducing said transient current flow in said first electronic discharge device to zero magnitude.

HARVEY L. GLICK.

REFERENCES CITED

The following references are of record in the file of this patent:

UNITED STATES PATENTS

| Number | Name | Date |
|---|---|---|
| 2,405,843 | Moe | Aug. 13, 1946 |
| 2,411,062 | Schade | Nov. 12, 1946 |
| 2,416,188 | McClellan | Feb. 18, 1947 |
| 2,424,481 | McCoy | July 22, 1947 |
| 2,435,598 | Oliver | Feb. 10, 1948 |
| 2,440,992 | Webb | May 4, 1948 |
| 2,457,062 | Moore | Dec. 21, 1948 |